3,255,028
SIZING OF PAPER MATERIALS
William P. Fairchild, San Diego, Calif., assignor to Kelco Company, San Diego, Calif., a corporation of Delaware
No Drawing. Filed Aug. 9, 1961, Ser. No. 130,241
5 Claims. (Cl. 106—208)

This invention relates to sizing of paper, and more particularly to surface sizing so as to decrease water penetration into the finished sheet.

Sizing of paper is very common, and indeed most paper, except for newsprint, is treated with various materials to toughen the paper, to densify the surface, and the like. A particular field in which the characteristics of the size are especially important is that of containers for food, such as paper drinking cups for hot liquids, especially hot coffee; paper cartons for ice cream, frozen food of all descriptions, salads, and the like. In such applications, it is not only desirable but essential to retard the ingress of water from the food product into the paper. At the same time, the leaching out of any materials within the paper into the food product must be avoided. A good example of these requirements is presented by the common paper cup used for serving coffee. This must not only be impermeable to hot coffee so that the outside of the cup remains visibly and palpably dry, but penetration of the hot coffee into the paper structure itself must be avoided, in order to maintain sufficient tensile strength in the paper sheet. Of almost equal importance is the necessity for preventing the leaching out of any materials within the paper into the coffee. In practice, the latter requisite is seldom entirely met, and coffee so served commonly has a disagreeable "paper" taste.

An object of my invention, accordingly, is to provide a size for treating paper which prevents undue ingress or uptake of water by the so-treated paper, particularly of hot water as presented by hot coffee, hot tea, and the like.

Another object of my invention is to provide a size of this type which has no deleterious effect on the taste characteristics of foods and beverages contacted by the treated paper.

Another object of my invention is to provide a paper size which is entirely harmless, if accidentally ingested.

Other objects of my invention will become apparent as the description thereof proceeds.

Generally speaking and in accordance with an illustrative embodiment of my invention, I prepare a liquid size composition in which the essential ingredients are starch, an alkali metal alginate, and sodium aluminate; I apply this to the surface of the paper to be treated, and thereafter process the paper in the usual fashion so as to drive off the water and leave the size thereon. The usual calendering processes may be applied as well.

By the term "paper" as used herein and in the claims which follow, I mean to include paper material of all thicknesses, including quite thin paper of say 7 pound or 9 pound weight, which may be used as liners in heavier containers, for example, through thicker papers such as are commonly used for drinking cups for both cold and hot liquids, the somewhat thicker papers used as cointainers for frozen foods for the retail trade, and so on so as to include paperboard and cardboard and like materials, all of which present at least one surface which is of a paper material.

As the starch, I may use any of the starches commonly used for sizing paper. It is well known that as ordinarily obtained from plant sources, starch is ungelatinized and will not colloidally disperse in water but may be caused to do so by heating therein to above its gelatinization point, or by any other method which gelatinizes the starch. Accordingly by the term "starch" as used herein and in the claims which follow, I naturally mean a starch which is dispersible in water. The starch may be any of the common types used, such as maize (corn), potato, rice, milo maize, waxy maize, waxy sorghum, tapioca, arrowroot, manioc, sago, and the like. In many cases, these starches are used as is, except for a suitable gelatinizing treatment which may consist simply of boiling the starch in water. More commonly, however, the starches are treated in various ways, generally to make them "thin-boiling," by treatment with acids, oxidative treatments as with chloride, and the like, all of which is well known in the paper art, and further information on which may be found described in Chapter 18 of the book, "Chemistry and Industry of Starch," by R. W. Kerr, Second Edition, New York, 1950.

The alkali metal alginate may be sodium alginate, lithium alginate, potassium alginate, ammonium alginate, and the like, but from the practical standpoint of efficacy, availability, and price, I find sodium alginate best. Any of the commercially available viscosity grades may be used.

The sodium aluminate which I use is the ordinary material of commerce sold under that name, although for laboratory tests and the like especially purified grades may be employed.

It will be appreciated that for some purposes a relatively light degree of sizing will suffice, whereas for other purposes it will be desirable to size rather heavily. Moreover, it will be further appreciated that there will be variations depending upon the sizing equipment, and the nature and density of the paper material to be treated, all of which will result in a considerable range of usable size composition within the scope of the invention. In general however, it will be found that the starch content of my inventive sizing mixtures will range from 2% to 18% by weight of the composition. Less than 2% will in general be too dilute to yield a satisfactory sizing treatment, whereas higher than 18% will in general give a sizing liquid too viscous to work with conveniently. More commonly, from 5% to 10% will be used. The alkali metal alginate, which will almost always be sodium alginate, should be present within the range of $\frac{1}{20}$ to $\frac{1}{2}$ of the weight of the starch used. I have found that in general less than $\frac{1}{20}$ does not yield the results in accordance with the invention which are desired; while in excess of $\frac{1}{2}$ is not needed and may increase viscosity unduly for a given desired starch level. I have found further that the sodium aluminate must be present within the range of $\frac{1}{8}$ to $\frac{1}{3}$ of the weight of the alginate. Less than $\frac{1}{8}$ fails to give satisfactory results, while more than $\frac{1}{3}$ again is undesirable, particularly in giving too high a pH.

Generally speaking, the size composition is made up and applied to the paper material by the use of the equipment ordinarily used for surface sizing. This will not be described here since it is well known in the art. Likewise, it is not necessary to describe the subsequent processing after the application of the size, this consisting of removing the water from the paper material so as to leave the starch, alginate, and aluminate deposited in and on the paper surface, followed by calendering and like mechanical treatments.

I will now give a working example of my inventive composition and process.

Maize starch is treated with dilute sulfuric acid and subsequently neutralized with sodium carbonate, filtered, washed, and dried, so as to give a fluidity of 50, all as closure of which is incorporated herein by reference, and described in the Kerr book cited hereinabove, the disparticularly the disclosure on pages 76 and 77 thereof. It may be noted that 50 fluidity corn starch is a well-known article of commerce available from several starch manufacturers in this conutry. To 94.4 pounds of water, I add 5 pounds of the 50 fluidity corn starch just described and heat with stirring to 200° F. When this temperature has been reached, the starch has been gelatized and the mixture is allowed to come to room temperature. I then disperse therein ½ pound of sodium alginate, medium viscosity, which again is a well-known article of commerce available from a plurality of manufacturers. I then add 1/10 pound of sodium aluminate. This completes the exemplary size composition in accordance with my invention. My inventive process is further carried out by way of example by applying this composition to a 40 pound bleached sulfite pulp paper, at a surface density of 2 fluid ounces per square yard of surface, and subsequently drying the paper. It is then found, when the "hot coffee Cobb" test is applied, this being well known in the art, that the paper exhibits improved water impermeability properties over controls in which either the starch, the alginate, or the sodium aluminate are omitted.

While my invention has been described by the aid of specific examples and specific temperatures, proportions, processing conditions, and the like, it will be evident that many variations in ingredients, proportions, reaction conditions and the like are possible, within the scope of my invention as defined by the claims which follow.

What I claim is:

1. A surface sizing composition adapted to paper treatment to improve the water impermeability properties thereof comprising water, from 2% to 18% by weight of starch, an alkali metal alginate in an amount within the range of 1/20 to ½ of the weight of said starch, and sodium aluminate in the proportion of 1/8 to 1/3 of the weight of said alkali metal alginate.

2. The composition of claim 1 in which the alkali metal alginate is sodium alginate, in a weight proportion within the range of 1/20 to ½ of the weight of said starch.

3. A surface sizing composition for paper and the like to improve the water impermeability properties thereof consisting essentially of from 5% to 10% starch by weight of said composition, sodium alginate in a proportion within the range of 1/20 to ½ of the weight of said starch, and sodium aluminate in the proportion of within the range of 1/8 to 1/3 by weight of said sodium alginate.

4. The process of surface sizing paper to improve the water impermeability properties thereof which comprises the steps of: applying to a surface of said paper an aqueous composition consisting essentially of water, from 2% to 18% starch by weight of said composition, sodium alginate in the proportion of from 1/20 to ½ of the weight of said starch, and sodium aluminate in the proportion of 1/8 to 1/3 of said sodium alginate; and thereafter drying said paper.

5. The process of surface sizing paper to improve the water impermeability properties thereof which comprises applying to a surface of said paper a liquid composition consisting essentially of water, from 5% to 10% starch by weight of said composition, sodium alginate in the proportion of 1/20 to ½ of the weight of said starch, and sodium aluminate in the proportion of 1/8 to 1/3 of said sodium alginate, and subsequently evaporating the water from said paper so as to leave a dry, sized surface.

References Cited by the Examiner

UNITED STATES PATENTS

| 1,977,574 | 10/1934 | Corson | 162—178 |
| 2,207,555 | 7/1940 | Rowland. | |
| 2,477,912 | 8/1949 | Vallandigham | 106—213 |

FOREIGN PATENTS

| 393,774 | 6/1933 | Great Britain. |
| 776,799 | 6/1957 | Great Britain. |

ALEXANDER H. BRODMERKEL, *Primary Examiner.*

JOSEPH REBOLD, *Examiner.*

J. CARSON, J. E. CALLAGHAN, *Assistant Examiners.*